(12) United States Patent
Kazakevich et al.

(10) Patent No.: US 7,254,189 B1
(45) Date of Patent: Aug. 7, 2007

(54) BLIND CARRIER OFFSET DETECTION FOR QUADRATURE MODULATED DIGITAL COMMUNICATION SYSTEMS

(75) Inventors: Leonid Kazakevich, Plainview, NJ (US); Fatih Ozluturk, Port Washington, NY (US); Alexander Reznik, Princeton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/258,626

(22) PCT Filed: Apr. 25, 2000

(86) PCT No.: PCT/US00/11125

§ 371 (c)(1),
(2), (4) Date: Mar. 25, 2003

(87) PCT Pub. No.: WO01/82546

PCT Pub. Date: Nov. 1, 2001

(51) Int. Cl.
*H04L 27/00* (2006.01)
(52) U.S. Cl. .................. 375/326; 375/332; 375/344
(58) Field of Classification Search ................ 375/326, 375/332, 344
See application file for complete search history.

(56) References Cited

U.S. PATENT DOCUMENTS 6,687,309 B1 * 2/2004 Zhang et al. ................ 375/261
6,728,326 B1 * 4/2004 Fulghum ..................... 375/365

OTHER PUBLICATIONS

Cowley W G et al.: "Estimation of Frequency Offset in Mobile Satellite Modems" International Mobile Satellite Conference, Jun. 16-18, 1993, pp. 417-422.

Franks L E: "Carrier and Bit Synchronization in Data Communication a Tutorial Review", IEEE Transactions On Communications, US, IEEE Inc. New York, vol. COM-28, No. 8, Aug. 1, 1980, pp. 1107-1121.

Ahmed W K M et al.: "A Method for Coarse Frequency Acquisition for Nyquist Filtered MPSK", IEEE Transactions On Vehicular Technology, US, IEEE Inc. New York, vol. 5, No. 4 Nov.1, 1996, pp. 720-731.

Taub H et Schilling D L.: "Principles Of Communication Systems", 1986, McGraw-Hill, New York, p. 264, line 13-p. 265, line 37; figure 6.5.5, p. 275, line 1 -p.276, line 3; figure 6.7.3.

Cowley et al., "Estimation of Frequency Offset in Mobile Satellite Modems", International Mobile Satellite Conference, Jun. 16-18, 1993, pp. 417-422.

Franks, "Carrier and Bit Synchronization in Data Communication A Tutorial Review", IEEE Transactions on Communications, US, IEEE Inc. New York, vol. COM-28, No. 8, Aug. 1, 1980, pp. 1107-1121.

Ahmed et al., "A Method for Coarse Frequency Acquisition for Nyquist Filtered MPSK", IEEE Transactions on Vehicular Technology, vol. 5, No. 4, Nov. 1, 1996, pp. 720-731.

Schilling et al., "Principals of Communication Systems", 1986, McGraw-Hill, New York, pp. 264, line 13; p. 265, line 37; figure 6.5.5, p. 275; line 1, p. 276; line 3; figure 6.7.3.

Visser et al., "A Novel Method for Blind Frequency Offset Correction in an OFDM System", IEEE, 1998, pp. 816-820.

\* cited by examiner

*Primary Examiner*—Temesghen Ghebretinsae
*Assistant Examiner*—Juan Alberto Torres
(74) *Attorney, Agent, or Firm*—Volpe and Koenig, P.C.

(57) ABSTRACT

A system and method for estimating the frequency offset experienced between carrier and local oscillator frequencies in communication systems using quadrature modulation. The invention exploits the geometry of the quadrature modulation constellation and estimates actual offset within a predefined carrier offset value without requiring data estimation.

8 Claims, 5 Drawing Sheets

BLIND CARRIER OFFSET DETECTION FOR QUADRATURE MODULATED DIGITAL COMMUNICATION SYSTEMS

BACKGROUND OF THE INVENTION

1. Field of the Invention

The present invention relates generally to digital communication systems using quadrature modulation techniques. More specifically, the invention relates to a system and method for blind detection of carrier frequency offsets in such systems.

2. Description of the Prior Art

A digital communication system typically transmits information or data using a continuous frequency carrier with modulation techniques that vary its amplitude, frequency or phase. After modulation, the signal is transmitted over a communication medium. The communication media may be guided or unguided, comprising copper, optical fiber or air and is commonly referred to as the communication channel.

The information to be transmitted is input in the form of a bit stream which is mapped onto a predetermined constellation that defines the modulation scheme. The mapping of each bit as symbols is referred to as modulation.

Each symbol transmitted in a symbol duration represents a unique waveform. The symbol rate or simply the rate of the system is the rate at which symbols are transmitted over the communication channel. A prior art digital communication system is shown in FIG. 1. While the communication system shown in FIG. 1 shows a single communication link, those skilled in this art recognize that a plurality of multiple access protocols exist. Protocols such as frequency division multiple access (FDMA), time division multiple access (TDMA), carrier sense multiple access (CSMA), code division multiple access (CDMA) and many others allow access to the same communication channel for more than one user. These techniques can be mixed together creating hybrid varieties of multiple access schemes such as time division duplex (TDD). The type of access protocol chosen is independent of the modulation type.

One family of modulation techniques is known as quadrature modulation and is based on two distinct waveforms that are orthogonal to each other. If two waveforms are transmitted simultaneously and do not interfere with each other, they are orthogonal. Two waveforms generally used for quadrature modulation are sine and cosine waveforms at the same frequency. The waveforms are defined as $$s_1(t) = A\cos(2\pi f_c t) \quad \text{Equation 1}$$

and $$s_2(t) = A\sin(2\pi f_c t) \quad \text{Equation 2}$$

where $f_c$ is the carrier frequency of the modulated signal and A is the amplitude applied to both signals. The value of A is irrelevant to the operation of the system and is omitted in the discussion that follows. Each symbol in the modulation alphabet are linear combinations generated from the two basic waveforms and are of the form $a_1 \cos(2\pi f_c t) + a_2 \sin(2\pi f_c t)$ where $a_1$ and $a_2$ are real numbers. The symbols can be represented as complex numbers, $a_1 + ja_2$, where j is defined as $j = \sqrt{-1}$.

The waveforms of Equations 1 and 2 are the most common since all passband transmission systems, whether analog or digital, modulate the two waveforms with the original baseband data signal. Quadrature modulation schemes comprise various pulse amplitude modulation (PAM) schemes (where only one of the two basic waveforms is used), quadrature amplitude modulation (QAM) schemes, phase shift keying (PSK) modulation schemes, and others.

A prior art quadrature modulator is shown in FIG. 2. The modulator maps the input data as a pair of numbers $\{a_1, a_2\}$ which belong to a set defined by the modulation alphabet. $a_1$ represents the magnitude (scaling) of the first waveform and $a_2$ represents the magnitude (scaling) of the second waveform. Each magnitude is modulated (i.e. multiplied) by the orthogonal waveforms. Each individual modulator accepts two signal inputs and forms an output signal at the carrier frequency.

A prior art quadrature demodulator is shown in FIG. 3. The demodulator generates sine and cosine waves at a carrier frequency $[f_c]f_{LO}$ for demodulation. Ignoring channel effects, the received signal can be represented as $$r(t) = a_1(t)\cos(2\pi f_c t + \phi_0) + a_2(t)\sin(2\pi f_c t + \phi_0) \quad \text{Equation 3}$$

where $a_1(t)$ represents the plurality of amplitudes modulated on waveform $s_1(t)$ as defined by Equation 1 and $a_2(t)$ represents the plurality of amplitudes modulated on waveform $s_2(t)$ as defined by Equation 2. $\phi$ is an arbitrary phase offset which occurs during transmission.

The cosine and sine demodulator signal components are defined as:

$$r_c(t) = r(t)^* \cos(2\pi f_{LO} t) = \quad \text{Equation 4}$$
$$\frac{1}{2}a_1 \cos((f_c - f_{LO})t + \phi_0) + \frac{1}{2}a_2 \sin((f_c - f_{LO})t + \phi_0) +$$
$$\frac{1}{2}a_1 \cos((f_c + f_{LO})t + \phi_0) + \frac{1}{2}a_2 \sin((f_c + f_{LO})t + \phi_0)$$

and $$r_s(t) = r(t)^* \sin(2\pi f_{LO} t) = \quad \text{Equation 5}$$
$$\frac{1}{2}a_2 \cos((f_c - f_{LO})t + \phi_0) - \frac{1}{2}a_1 \sin((f_c - f_{LO})t + \phi_0) -$$
$$\frac{1}{2}a_2 \cos((f_c + f_{LO})t + \phi_0) + \frac{1}{2}a_1 \sin((f_c + f_{LO})t + \phi_0)$$

The carrier frequency components, $f_c + f_{LO}$, are suppressed by the lowpass filters. The signals after filtering are:

$$y_c(t) = \frac{1}{2}a_1 \cos((f_c - f_{LO})t + \phi_0) + \frac{1}{2}a_2 \sin((f_c - f_{LO})t + \phi_0) \quad \text{Equation 6}$$

and $$y_s(t) = \frac{1}{2}a_2 \cos((f_c - f_{LO})t + \phi_0) - \frac{1}{2}a_1 \sin((f_c - f_{LO})t + \phi_0) \quad \text{Equation 7}$$

If the local oscillator frequency in Equations 6 and 7 is equal to the carrier frequency, $f_{LO} = f_c$, and the phase offset is equal to zero, $\phi_0 = 0$, the right hand sides of Equations 6 and 7 become $\frac{1}{2}a_1(t)$ and $\frac{1}{2}a_2(t)$ respectively. Therefore, to effect precise demodulation, the local oscillator must have the same frequency and phase as that of the carrier waveform. However, signal perturbations occurring during transmission as well as frequency alignment errors between the local oscillators of the transmitter and receiver manifest a difference between the carrier and local oscillator frequencies which is known as carrier offset. A phase difference between the carrier and local oscillator frequency is created as well. However, if the difference in frequencies is corrected, the difference in phase is simple to remedy. Phase correction is beyond the scope of the present disclosure.

Carrier frequency offset is defined as:

$$\Delta f = f_c - f_{LO}.$$ 
Equation 8

To synchronize either parameter, the frequency and phase offsets need to be estimated. In prior art receivers, frequency offset estimation is performed after a significant amount of data processing. Without correcting offset first, the quality of downstream signal processing suffers.

"Estimation of Frequency Offset in Mobile Satellite Modems" by Cowley et al. International Mobile Satellite Conference, 16-18 Jun. 1993, pp. 417-422, discloses a circuit for determining a frequency offsets in mobile satellite applications. The frequency offset estimation uses a low pass filter, an $M^{th}$ power block, a square fast Fourier transform block and a peak search block.

"A method for Course Frequency Acquisition for Nyquist Filtered MPSK" by Ahmed IEEE Transactions on Vehicular Technology, vol. 5, no. 4, 1 Nov. 1996, pp. 720-731, discloses a frequency offset estimator for mobile satellite communications. The estimator uses a low pass filter, a decimator, a fast Fourier transform block and a search algorithm.

"Carrier and Bit Synchronization in Data Communication—A tutorial Review" by Franks IEEE Transactions on Communications, US, IEEE Inc. New York, vol. COM-28, no. 8, 1 Aug. 1980, pp. 1107-1121, discloses carrier phase recovery circuits using elementary statistical properties and timing recovery based on maximum-likelihood estimation theory.

What is needed is a system and method of detecting and estimating carrier frequency offset before any data signal processing is performed.

SUMMARY OF THE INVENTION

The present invention provides a system and method for estimating the frequency offset experienced between carrier and local oscillator frequencies in communication systems using quadrature modulation. The invention exploits the geometry of the quadrature modulation constellation and estimates actual offset within a predefined carrier offset value without requiring data estimation.

Accordingly, it is an object of the invention to provide a less-complex system and method for blindly estimating carrier frequency offset.

It is another object of the present invention to blindly estimate carrier offset in a communication system using quadrature modulation regardless of the access protocol.

Accordingly, it is an object of the invention to provide a less-complex system and method for blindly estimating carrier frequency offset.

It is another object of the present invention to blindly estimate carrier offset in a communication system using quadrature modulation regardless of the access protocol.

Other objects and advantages of the system and method will become apparent to those skilled in the art after reading a detailed description of the preferred embodiment.

DETAILED DESCRIPTION OF THE INVENTION

Figure 1:
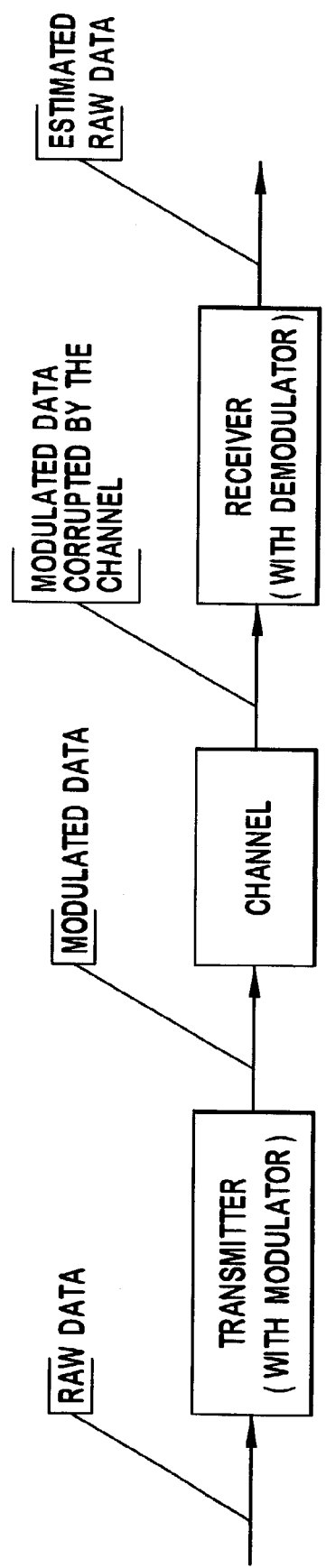
FIG. 1 is a simplified system diagram of a prior art digital communication system.
Figure 2:
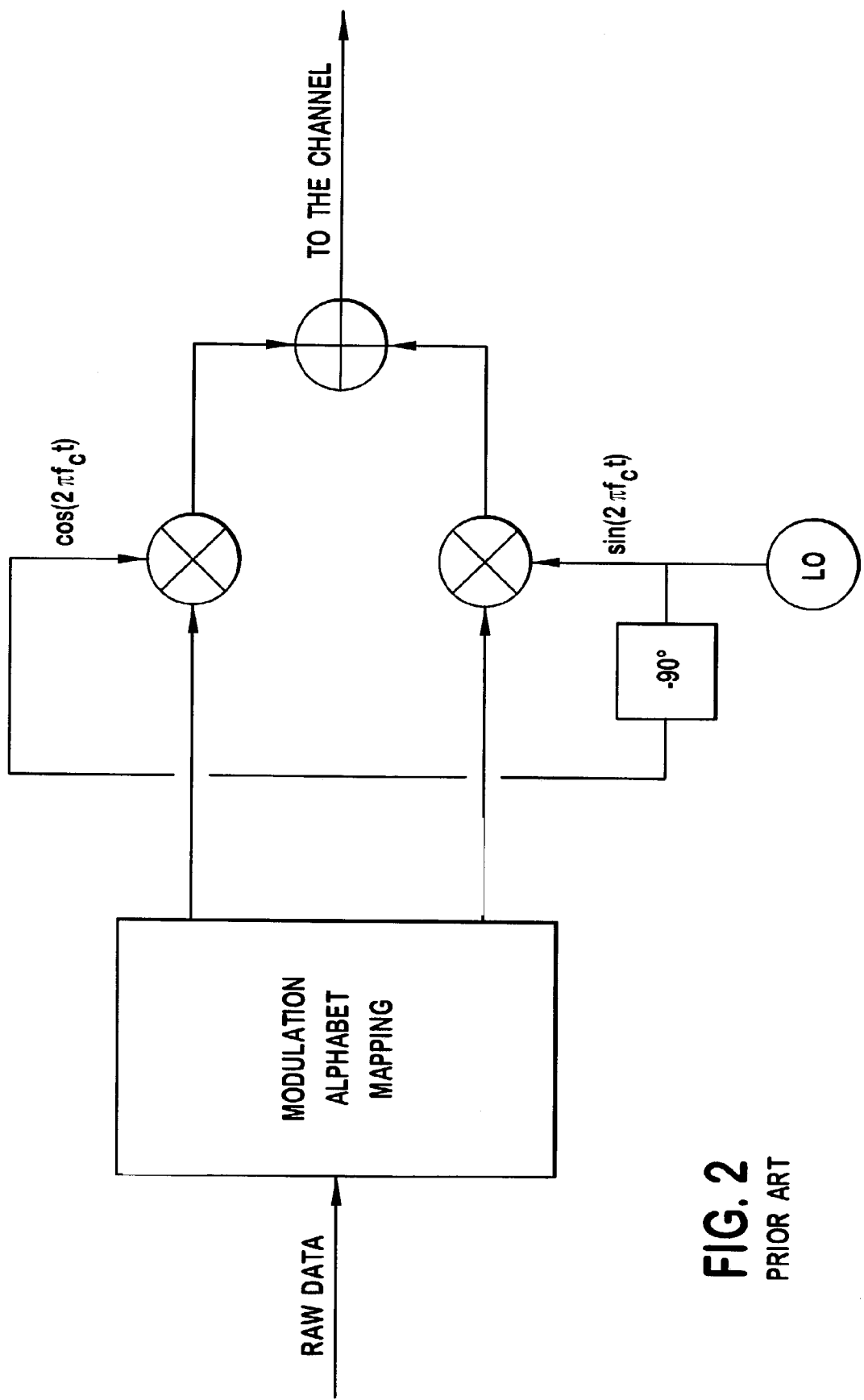
FIG. 2 is a system diagram of the prior art quadrature transmitter shown in FIG. 1.
Figure 3:
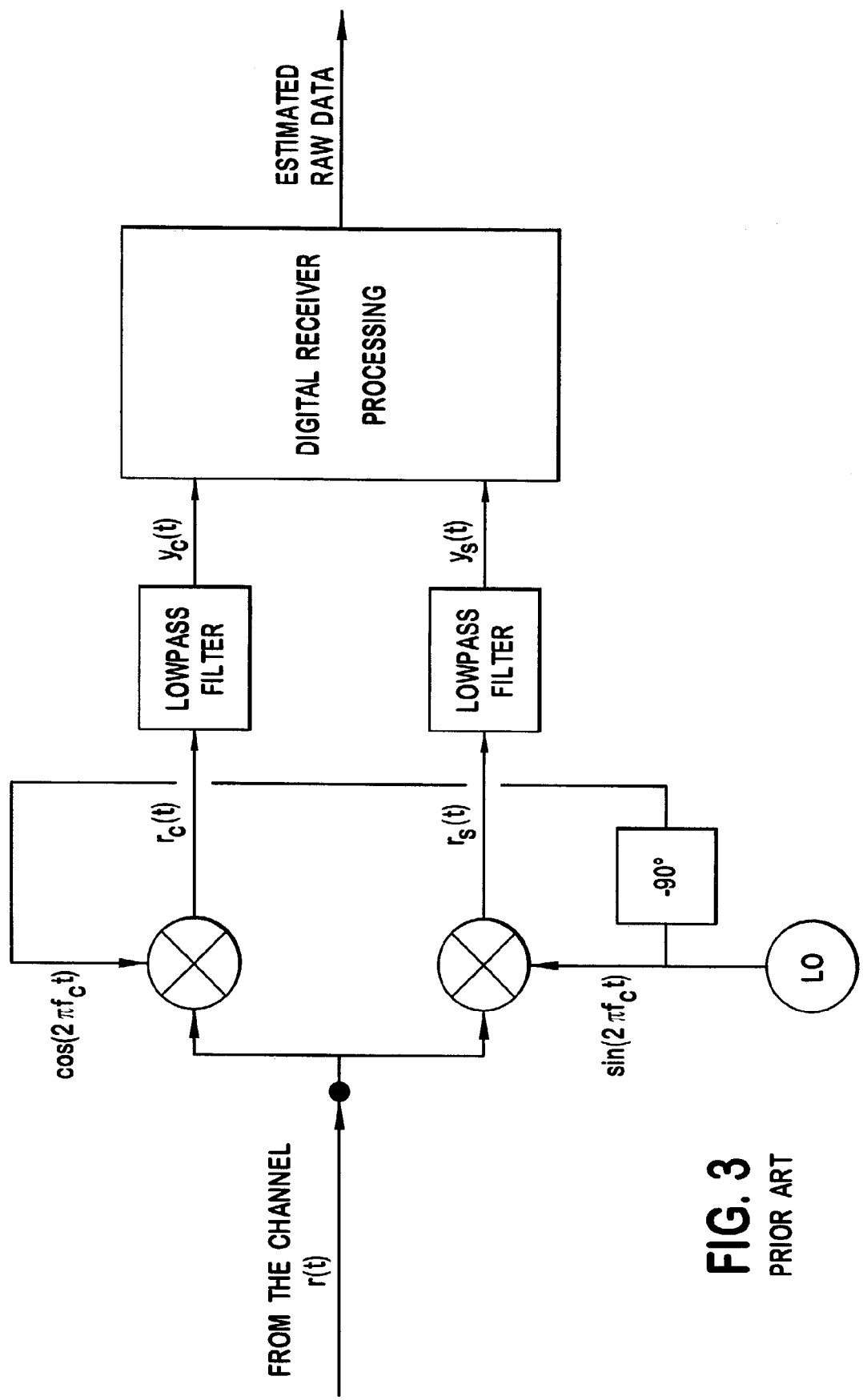
FIG. 3 is a system diagram of the prior art quadrature receiver shown in FIG. 1.

The embodiments will be described with reference to the drawing figures where like numerals represent like elements throughout.

Figure 4:
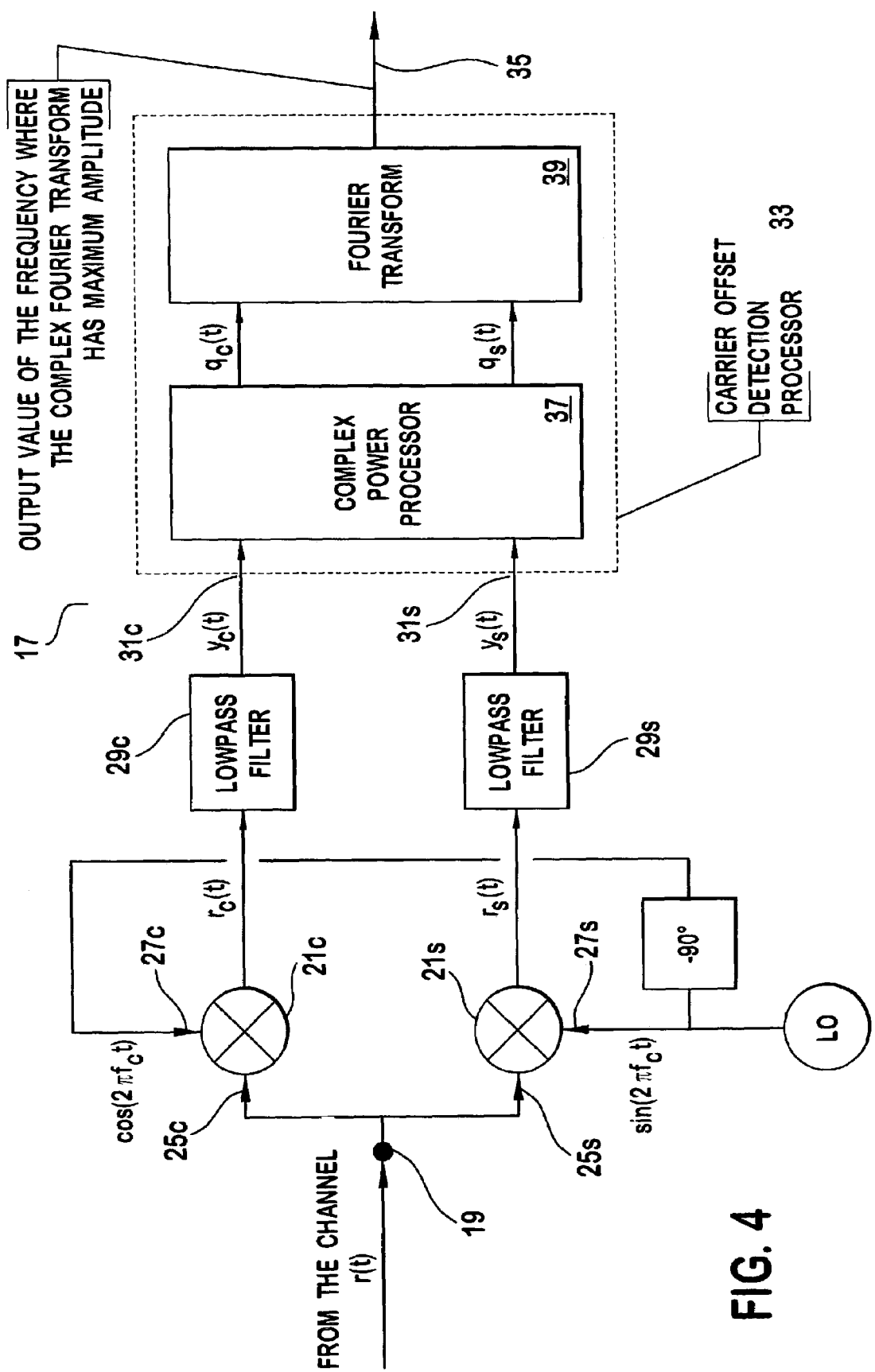
FIG. 4 is a system diagram of the blind carrier offset estimator of the present invention.

Shown in FIG. 4 is an analog or digital blind carrier detector 33 of the present invention. A quadrature modulated signal r(t) is received from a communication channel (not shown) and is input 19 to a receiver 17. One skilled in this art recognizes that additional conversion means may exist before the detector input 19 to convert the energy used in the transmission media to compatible signals and is beyond the scope of this disclosure. The received signal r(t) is coupled to a cosine mixer 21c and a sine mixer 21s. Each mixer 21c, 21s has a first input 25c, 25s for coupling with the received signal r(t) and a second input 27c, 27s for coupling with the output of a local oscillator LO. The local oscillator LO is programmed to generate cosine and sine waves at the carrier frequency $f_c$ (Equations 4 and 5) of the received signal r(t).

The carrier-frequency demodulated outputs $r_c(t)$, $r_s(t)$ from each mixer 21c, 21s are input to respective lowpass filters 29c, 29s which suppress high-frequency noise components impressed upon the received signal r(t) during transmission through the transmission media and mixer sum frequencies, $f_c + f_{LO}$, (Equations 6 and 7). As in prior art demodulators, the response characteristics of the lowpass filters 29c, 29s may be a bandwidth as narrow as $\Delta f_{MAX}$—the maximum allowable carrier offset. The output $y_c(t)$, $y_s(t)$ from each lowpass filter 29c, 29s is coupled to inputs 31c, 31s of a carrier offset estimator 33.

The carrier offset estimator 33 produces an estimate of the carrier offset 35 before data signal processing commences using a complex power processor 37 in conjunction with a complex Fourier transform processor 39. The filtered, carrier frequency demodulated cosine and sine components of the quadrature signal $y_c(t)$ and $y_s(t)$ are coupled to the complex power processor 37 which performs an intermediate power calculation of each quadrature component in the form of $x^y$ where the powers y comprise integer multiples of four; i.e. y=4, 8, 12, 16 . . . . In the preferred embodiment, the power y is 4.

The complex power processor 37 may be implemented to raise the input complex signal to a power which is any positive integer multiple of four. Carrier offset detection systems which use a complex power processor with a power of two or its positive integer multiples are known in the art. However, these prior art systems do not work in quadrature-modulated digital communication systems. To properly detect a carrier offset in a quadrature-modulated digital communication system demodulator, a complex power of four or its integer multiples are necessary.

The complex power processor 37 combines the lowpass filter outputs $y_c(t)$ and $y_s(t)$ into a single complex value signal y(t) defined as:

$$y(t)=y_c(t)+jy_s(t) \quad \text{Equation 9}$$

where j is defined as $j=\sqrt{-1}$. The complex power processor 37 generates two power output signals $$q_c(t)=Re\{(y(t))^4\} \quad \text{Equation 10}$$

and $$q_s(t)=Im\{(y(t))^4\} \quad \text{Equation 11}$$

where Re{x} denotes the real part of a complex number x, and Im{x} denotes the imaginary part of the complex number x. The complex power processor 37 removes the modulation component from each received symbol leaving the carrier frequency. The real $q_c(t)$ and imaginary $q_s(t)$ signal components are output and coupled to the complex Fourier transform processor 39.

The complex Fourier transform processor 39 treats the real $q_c(t)$ and imaginary $q_s(t)$ signal components as a single complex input signal $q(t)=q_c(t)+jq_s(t)$. The processor observes q(t) for a finite period of time $T_W$ and computes a complex Fourier transform of the observed signal q(t) over this period of time.

The Fourier processor 39 performs a Fourier transform of the power processed signals from the observed period $T_W$ and outputs a frequency at which the amplitude of the transform was measured to be maximal $\Delta f_{MAX}$ during that time period $T_W$. The output 35 represents an accurate estimate of $\Delta f$ and is signed since the transform input signal is complex. The sign identifies whether the local oscillator LO frequency is less than or greater than the carrier frequency.

Figure 5:
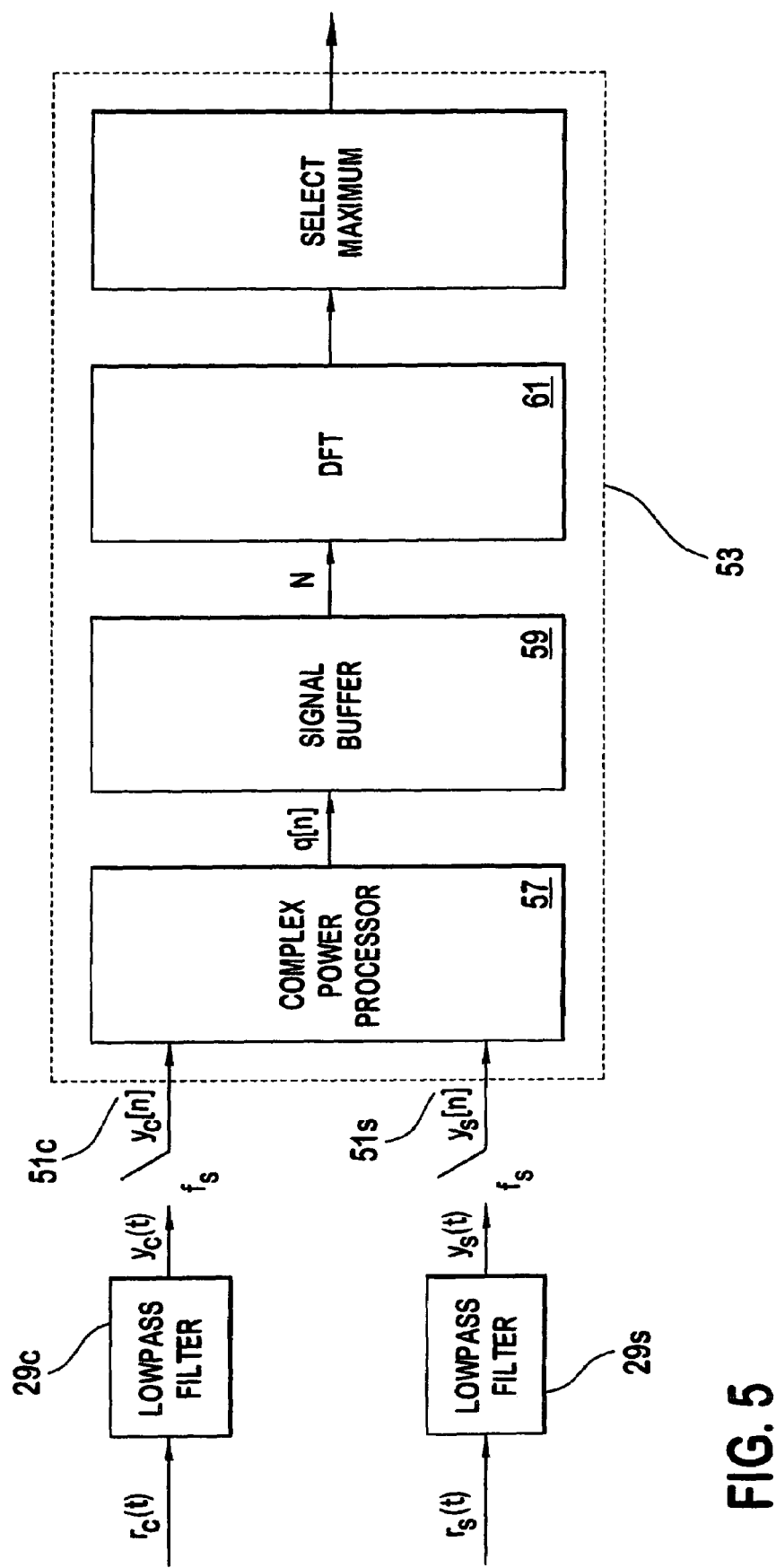
FIG. 5 is a detailed system diagram of a blind digital carrier offset estimator of the present invention.

A detailed, low-complexity digital implementation of the present invention 53 is shown in FIG. 5. Lowpass filter 29c, 29s output signals $y_c(t)$ and $y_s(t)$ are sampled at a sampling rate $f_s$ to produce discrete-time signals $y_c[n]$ and $y_s[n]$. To ensure that all possible carrier frequency offsets up to $\Delta f_{MAX}$ are detected, $2\Delta f_{MAX} < f_s$ must be satisfied. The passband of the low pass filters 29c, 29s must be wider than $\Delta f_{MAX}$ to avoid suppressing the signal which contains the carrier offset information.

The sampled signals $y_c[n]$ and $y_s[n]$ are input 51c, 51s to a complex power processor 57 and combined as a single complex signal, y[n], where $y[n]=y_c[n]+jy_s[n]$. The power processor 57 produces a complex output defined by $q[n]=(y[n])^4$. The output q[n] is coupled to a buffer 59 for accumulating N outputs from the complex power processor 57.

The accumulated block of complex numbers N is coupled to a digital Fourier transform (DFT) processor 61 which performs a transform from the time domain to the frequency domain for the N complex numbers. The DFT processor 61 outputs N complex numbers corresponding with the input N. Each number is associated with a particular frequency ranging from $-f_s/2$ to $(+f_s/2-f_s/N)$. Each frequency is $f_s/N$ away from a neighboring frequency. The frequency domain values output by the DFT 61 are assembled and compared with one another. The value having the largest magnitude represents the best estimate of the carrier frequency offset $\Delta f$.

The embodiment described in FIG. 5 is capable of estimating all carrier frequency offsets smaller than $f_s/2$. This follows from the restriction $2\Delta f_{MAX} < f_s$ imposed above. The carrier offset $\Delta f$ is resolved to within a frequency uncertainty of $\pm f_s/2N$ since the frequencies at the output of the DFT 61 are quantized to a grid with a spacing of fs/N. Since the frequencies are fs/N away from each other, the invention 53 renders precision within $\pm\frac{1}{2}$ of the selected value. Therefore, the number of samples N accumulated for the Fourier processor 61 to transform determines the resolution of the carrier offset estimate $\Delta f$. An efficient implementation of the DFT 61 used in the present invention 53 can be achieved using the fast Fourier transforms (FFT) family of algorithms.

The present invention 33, 53 may be physically realized as digital hardware or as software. The lowpass filters shown in FIG. 5 may be realized in digital hardware or software operating at a sampling rate faster than $f_s$. In some communication systems, for example those employing CDMA protocols, the lowpass filters and downsamplers $f_s$ may be replaced with accumulators and integrate-and-dump processes.

While the present invention has been described in terms of the preferred embodiments, other variations which are within the scope of the invention as outlined in the claims below will be apparent to those skilled in the art.

What is claimed is:

1. A detector (33) for use in a receiver (17) that estimates a difference ($\Delta f$) between a received quadrature demodulated communication signal (r(t)) carrier frequency ($f_c$) and a local oscillator (LO) frequency used for demodulation, the detector (33) characterized by:

a complex power processor (37) for receiving the quadrature demodulated communication signal (r(t)) cosine ($y_c(t)$) and sine ($y_s(t)$) components producing real (Re$\{(y(t))^y\}$) and imaginary (Im$\{(y(t))^y\}$) power signal components, by obtaining a power ($^y$) that is an integer multiple of four for each of the cosine ($y_c(t)$) and sine ($y_s(t)$) components, said power signal components coupled to a complex Fourier transform (39);

said complex Fourier transform (39) performing a complex Fourier transform on said power signal components for a predefined period of time outputting a frequency transform containing a plurality of frequencies observed during said predefined period of time and wherein the Fourier transform includes a reference sign to an offset frequency based upon the received real (Re$\{(y(t))^y\}$) and imaginary (Im$\{(y(t))^y\}$) power signal components, and wherein said reference sign indicates the local oscillator frequency being less than or greater than the carrier frequency; and said plurality of frequencies having a maximum frequency corresponding to the difference ($\Delta f$) between the carrier ($f_c$) and local oscillator (LO) frequencies.

2. A method (33) for estimating a difference ($\Delta f$) between a received (17) quadrature demodulated communication signal (r(t)) carrier frequency ($f_c$) and a local oscillator (LO) frequency used for demodulation, the method (33) characterized by the steps of:

a) performing a complex power calculation on the received quadrature demodulated communication signal (r(t)) cosine ($y_c(t)$) and sine ($y_s(t)$) components producing real (Re$\{(y(t))^y\}$) and imaginary (Im$\{(y(t))^y\}$) power signal components by obtaining a power ($^y$) that is an integer multiple of four for each of the cosine ($y_c(t)$) and sine ($y_s(t)$) components;

b) transforming said real (Re$\{(y(t))^y\}$) and imaginary (Im$\{(y(t))^y\}$) power signal components into Fourier frequency domain values representing a plurality of frequencies;

c) assigning a reference sign to an offset frequency based upon the received real ($\operatorname{Re}\{(y(t))^v\}$) and imaginary ($\operatorname{Im}\{(y(t))^v\}$) power signal components, and wherein said reference sign indicates the local oscillator frequency being less than or greater than the carrier frequency;

d) selecting a maximum frequency from said plurality of frequencies; and e) outputting said selected frequency as the difference frequency ($\Delta f$).

3. A detector (53) for use in a receiver (17) that estimates a difference ($\Delta f$) between a received quadrature demodulated communication signal ($r(t)$) carrier frequency ($f_c$) and a local oscillator (LO) frequency used for demodulation, the detector (53) characterized by:

a sampler ($f_s$) sampling the received quadrature demodulated communication signal ($r(t)$) components ($y_c(t)$), ($y_s(t)$) into discrete time ($y_c([n])$), ($y_s[n]$) signal components, said discrete time ($y_c[n]$), ($y_s[n]$) signal components coupled to a complex power processor (57);

said complex power processor (57) performs a complex power calculation on said discrete time ($y_c[n]$), ($y_s[n]$) signal components producing real ($\operatorname{Re}\{(y[n])^v\}$) and imaginary ($\operatorname{Im}\{(y[n])^v\}$) power signal components by obtaining a power ($^v$) that is an integer multiple of four for each of the cosine ($y_c(t)$) and sine ($y_s(t)$) components which are output ($q[n]$) to a buffer (59);

said buffer (59) accumulates a plurality (N) of complex power processor (57) outputs ($q[n]$) for a predefined period of time as a block of data ($T_w$), said block of data ($T_w$) is output to a complex Fourier processor (61);

said complex Fourier processor (61) performs a complex Fourier transform on said block of data ($T_w$) outputting a frequency transform containing a plurality of frequencies ($-f_s/2$ to ($+f_s/2-f_s/N$)) observed during said predefined period of time, said output ($-f_s/2$ to ($+f_s/2-f_s/N$)) is coupled to a selector, and wherein the Fourier transform includes a reference sign to an offset frequency based upon the received real ($\operatorname{Re}\{(y(t))^v\}$) and imaginary ($\operatorname{Im}\{(y(t))^v\}$) power signal components, and wherein said reference sign indicates the local oscillator frequency being less than or greater than the carrier frequency; and said selector (63) selects from said plurality of frequencies a maximum frequency which corresponds to the difference ($\Delta f$) between the carrier ($f_c$) and local oscillator (LO) frequencies.

4. The detector (53) according to claim 3, wherein said sampler ($f_s$) is further characterized by sampling the received quadrature demodulated continuous time ($y_c(t)$), ($y_s(t)$) signal components at a predefined ($2\Delta f_{MAX} < f_s$) frequency.

5. The detector (53) according to claim 3, wherein said complex Fourier transform (39) is further characterized as a fast Fourier transform.

6. A method (53) for estimating a difference ($\Delta f$) between a received (17) quadrature demodulated communication signal ($r(t)$) carrier frequency ($f_c$) and a local oscillator (LO) frequency used for demodulation, the method (53) characterized by the steps of:

a) sampling ($f_s$) received ($r(t)$) quadrature demodulated communication signal ($r(t)$) components ($y_c(t)$), ($y_s(t)$) into discrete time ($y_c[n]$), ($y_s[n]$) signal components;

b) performing a complex power calculation (57) on said discrete time ($y_c[n]$), ($y_s[n]$) signal components, said discrete time ($y_c[n]$), ($y_s[n]$) signal components including cosine ($y_c[n]$) and sine ($y_s[n]$) components by obtaining a power ($^v$) that is an integer multiple of four for each of the cosine ($y_c(t)$) and sine ($y_s(t)$) components;

c) buffering (59) an output (($y[n])^v$) of said complex power calculation [output (($y[n])^v$)] for a plurality (N) of complex power processor (57) outputs for a predefined period of time as a block of data ($T_w$);

d) transforming (61) said block of data ($T_w$) into Fourier frequency domain values representing a plurality of frequencies ($-f_s/2$ to ($+f_s/2-f_x/N$)) and assigning a reference sign to an offset frequency based upon the received real ($\operatorname{Re}\{(y(t))^v\}$) and imaginary ($\operatorname{Im}\{(y(t))^v\}$) power signal components, and wherein said reference sign indicates the local oscillator frequency being less than or greater than the carrier frequency;

e) selecting (63) a maximum frequency from said plurality of frequencies ($-f_s/2$ to ($+f_s/2-f_s/N$)); and f) outputting said selected frequency as the difference frequency ($\Delta f$).

7. The detector (53) according to claim 6, wherein step a) is further characterized by a step of sampling the received quadrature demodulated continuous time ($y_c(t)$), ($y_s(t)$) signal components at a predefined ($2\Delta f_{MAX} < f_s$) frequency.

8. The method (53) according to claim 6, wherein step d) is further characterized as a fast Fourier transform.

* * * * *

UNITED STATES PATENT AND TRADEMARK OFFICE
CERTIFICATE OF CORRECTION

| | | |
|---|---|---|
| PATENT NO. | : 7,254,189 B1 | Page 1 of 1 |
| APPLICATION NO. | : 10/258626 | |
| DATED | : August 7, 2007 | |
| INVENTOR(S) | : Kazakevich et al. | |

It is certified that error appears in the above-identified patent and that said Letters Patent is hereby corrected as shown below:

ON THE TITLE PAGE

Item (56), OTHER PUBLICATIONS, page 1, right column, line 7, after the words "New York, vol.", delete "5" and insert therefor --45--.

Item (56), OTHER PUBLICATIONS, page 1, right column, line 21, before "No.4, Nov.1,", delete "5" and insert therefor --45--.

Item (56), OTHER PUBLICATIONS, page 1, right column, line 21, delete reference to "Ahmed et al., "A Method for Coarse Frequency Acquisition fo Nyquist Filtered MPSK", IEEE Transactions on Vehicular Technology, vol. 5, No. 4, Nov. 1, 1996, pp.720-731.--.

At column 3, line 20, after the word "determining", delete "a".

At column 5, line 58, after the words "frequency is", delete "fs/N" and insert therefor --$f_s/N$--.

At column 6, line 2, after the words "spacing of", delete "fs/N" and insert therefor --$f_s/N$--.

At column 6, line 3, after the words "frequencies are", delete "fs/N" and insert therefor --$f_s/N$--.

Signed and Sealed this

Seventh Day of October, 2008

JON W. DUDAS
*Director of the United States Patent and Trademark Office*